[11] 3,710,015
[45] Jan. 9, 1973

[54] OPTICAL PROCESSOR FOR LASER DISPLAY SYSTEM

[75] Inventor: Vernon J. Fowler, East Meadow, N.Y. 11554
[73] Assignee: GTE Laboratories, Inc., Waltham, Mass.
[22] Filed: March 16, 1971
[21] Appl. No.: 124,799

[52] U.S. Cl. ........ 178/5.4 BD, 178/5.4 R, 178/7.3 D, 178/7.6
[51] Int. Cl. ............................................. H04n 9/12
[58] Field of Search .............. 178/5.4 R, 5.4 BD, 178/7.3 D, 7.5 D, 178/7.6, 7.7

[56] References Cited

UNITED STATES PATENTS

| | | | |
|---|---|---|---|
| 3,383,460 | 5/1968 | Pritchard | 178/5.4 BD |
| 3,507,984 | 4/1970 | Stavis | 178/7.6 X |
| 3,597,536 | 8/1971 | Fowler | 178/7.3 D |

OTHER PUBLICATIONS

IEEE Spectrum Dec. 1968, pp. 39–50.

*Primary Examiner*—Robert L. Richardson
*Attorney*—Irving M. Kriegeman

[57] ABSTRACT

An optical processor for a laser display system separates and provides individual modulation for a number of coaxial components of light contained within a multiwavelength laser beam. The optical processor is capable of operating with the video signals of conventional color television signals as part of a laser color television display system.

8 Claims, 3 Drawing Figures

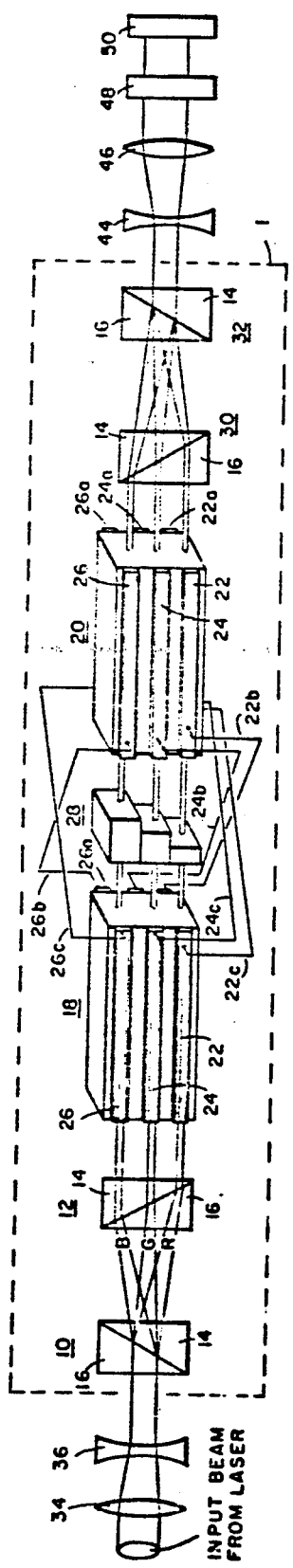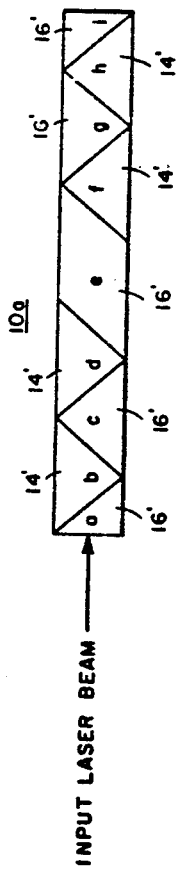

INVENTOR.
VERNON J. FOWLER
BY
ATTORNEY.

OPTICAL PROCESSOR FOR LASER DISPLAY SYSTEM

BACKGROUND OF THE INVENTION

An important advantage of lasers for both optical radar and electronically driven display applications is their ability to project narrow beams of extremely high intensity light. Spots of light generated by an incoherent source and projected on an object being tracked by a radar or on a display screen are less bright or intense than their source. Lasers are free of this limitation and readily produce projected spots which are of higher intensity than at the source. Also, light spots generated by a laser are many orders of magnitude brighter than those produced by an incoherent source.

One display application for which extremely high spot brightness is required is the projection of color television pictures onto a screen. A laser display system utilizes a narrow beam of laser light, modulates its intensity, deflects it in the horizontal and vertical planes at the appropriate scan frequencies to form a raster and then projects the pattern on a display screen. A typical laser color display system is disclosed in my copending application Ser. No. 728,218 now U.S. Pat. No. 3,597,534 filed May 10, 1968 and assigned to the same assignee as the present application.

The system of my copending application requires a separate color modulator for each of the primary colors. Thus a separate laser is required to generate each of the primary colors. Alternatively, the primary colors, which could be generated coaxially within a single laser cavity, must be separated and transmitted in diverse optical paths prior to being modulated by separate modulators and then recombined prior to being scanned and projected onto a display screen. The arrangement of beam separators, separate modulators and beam recombination apparatus involves many components, takes up much space, is difficult to adjust and is relatively expensive.

The present invention utilizes an optical processor to spatially separate the individual wavelengths of light and provide separate modulation for each wavelength thereby eliminating the disadvantages of directing the wavelengths of light in diverse optical paths, providing a separate modulator device for each wavelength, and then recombining the light into a single beam with an arrangement of mirrors and beam splitters.

SUMMARY OF THE INVENTION

This invention relates to an optical processor for separately modulating a plurality of coaxial wavelength components of light within a multiwavelength laser beam and, in particular, to an optical processor for use in a color laser display system wherein the color components of the beam of light are individually modulated in accordance with the information to be displayed.

In accordance with the present invention, a laser beam comprising a plurality of wavelength components is directed to an optical processore comprising a separation means and a light modulator. The separation means separates the components into a plurality of parallel spaced-apart beams of light. The beams of light emerging from the separation means are transmitted to the light modulator which has a plurality of light modulation sections, one beam of light being transmitted through each of the light modulation sections wherein it is separately polarization modulated in accordance with a modulating signal applied to that light modulation section.

In one embodiment of the present invention the separation means comprises a pair of direct-vision prism spectroscopes. The first spectroscope causes each of the components of the laser beam to be deflected through an angle which is proportional to its wavelength. The laser beam is thereby separated into a plurality of spaced-apart beams of light with each beam of light corresponding to one of the wavelengths in the laser beam. The second prism spectroscope causes an angular deflection of the individual beams of light equal to and in the opposite sense from the angular deflection caused by the first prism spectroscope. The separated light beams emerging from the second direct-vision prism spectroscope are therefore parallel to one another.

The light modulator consists of a pair of electro-optic crystals with a 90° polarization rotator positioned between them arranged in the configuration of a compensated-birefringence modulator. The light modulator has a plurality of sets of electrodes in contact with opposite faces of the two crystals, with each set of electrodes parallel to one of the beams of light. A modulating signal applied to one of the sets of electrodes causes polarization modulation of the corresponding beam of light. Each of the beams of light, corresponding a wavelength of the original laser beam, emerge from the light modulator polarization modulated in accordance with an applied modulating signal. The individual beams of light may be recombined into a single coaxial laser beam by using a second pair of direct-vision prism spectroscopes identical to the first pair by operating in the reverse sense.

The optical processor of this invention can readily be used in a color laser display system such as described in my pending patent application Ser. No. 728,218. In a laser color television display system using the optical processor of this invention, the colors required for the laser display may be generated by a single laser, typically a mixed gas argon-krypton ion laser which produces red, green and blue beams of sufficient intensity and with the proper power distribution for use in a full color television projection system. Color information is provided by modulating each component of the primary beam colors. Consequently, the recombined beam emerging from the second pair of direct-vision prism spectroscopes contains the video information in the form of an imposed polarization modulation on each of the separate wavelength components. The beam is directed to a polarization beam splitter which resolves the beam into two intensity modulated multiwavelength beams. The beams are then directed to a horizontal beam scanner which provides the horizontal line scan pattern. In the case of a television display system, the output of the horizontal beam scanner is driven to provide a 15.75 kilohertz scan rate. The line scan is then directed to a second slower or vertical beam scanner to complete the required raster scan.

BRIEF DESCRIPTION OF THE DRAWINGS

FIG. 1 is a diagrammatic representation of the optical processor of this invention.

FIG. 2 is a diagram of a second embodiment of the separation means.

DESCRIPTION OF THE PREFERRED EMBODIMENT

Figure 3:
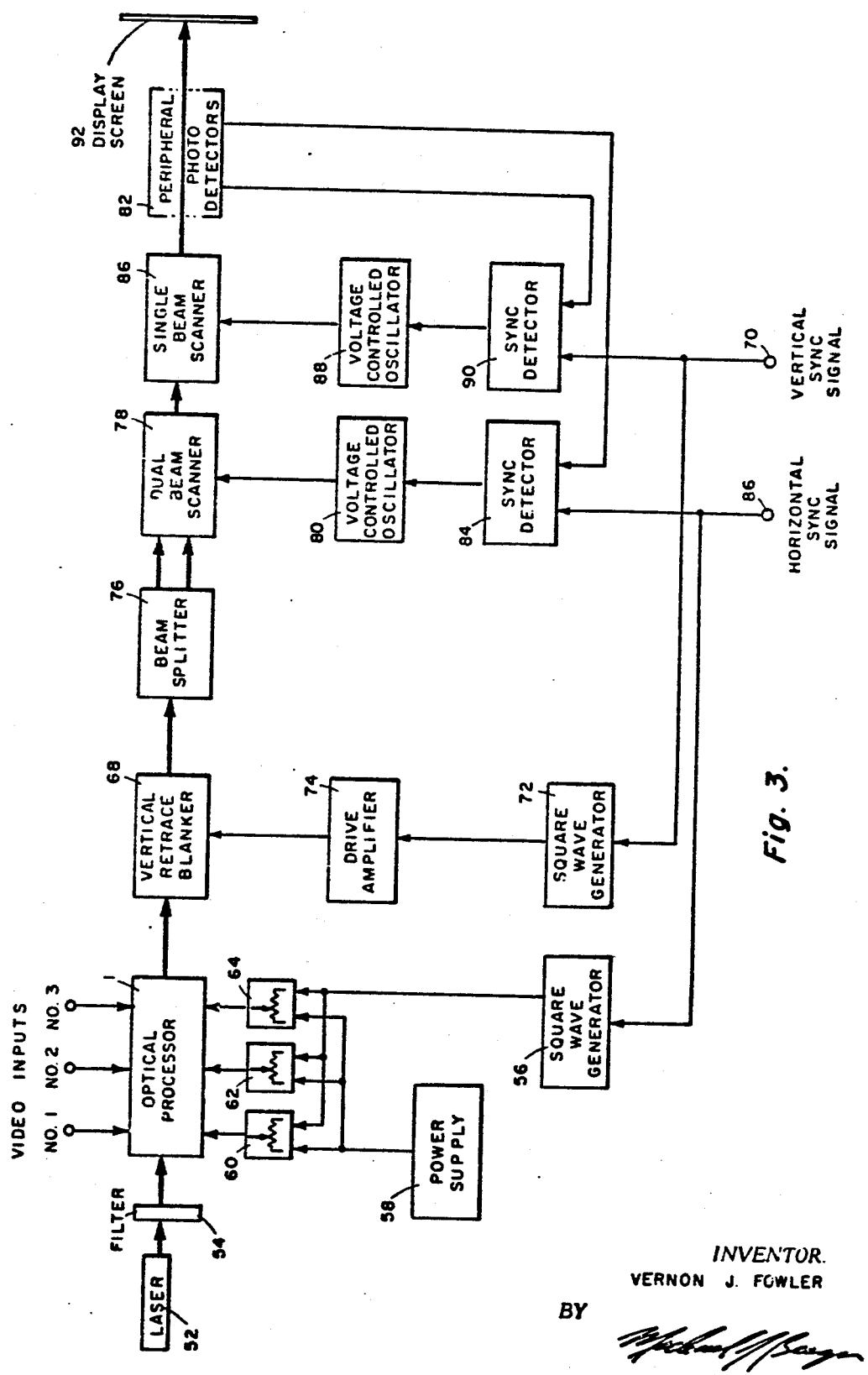
FIG. 3 is a block diagram of a display system utilizing the optical processor of this invention.

Referring now to FIG. 1, there is shown a diagrammatic representation of the optical processor 1 of this invention. The input laser beam is a multiwavelength coaxial beam of light, preferably generated within a single laser cavity. One example of an ion gas krypton-argon laser commercially available from Coherent Radiation Laboratories has the following output characteristics:

| Wavelength (Å) | Output (MW) |
|---|---|
| 4765 (Minor Blue) | 180 |
| 4880 (Major Blue) | 310 |
| 5145 (Major Green) | 370 |
| 5208 (Minor Green) | (not measured) |
| 5682 (Major Yellow) | (not measured) |
| 6471 (Major Red) | 320 |
| 6764 (Minor Red) | (not measured) |

The output of this laser includes in addition to high power in the three primary colors required for a color display system, designated major red, major green and major blue, a high power yellow component and additional lower power red, green and blue components designated minor red, minor green and minor blue respectively. The yellow component generated by the laser can be separately modulated and utilized if desired or can be blocked before or after entering the light modulator. For purposes of describing the operation of the optical processor, the input laser beam will be considered to contain only the major and minor red, green and blue components. The optical processor can be adapted to modulate a laser beam having a different number of components or components having different wavelengths.

Optical processor 1 includes means for separating the color components of light, preferably comprising a pair of identical direct-vision prism spectroscopes 10 and 12 separated by an air gap. Each spectroscope is composed of a low dispersion glass element 14 and a high dispersion glass element 16. Alternatively a single glass prism can be used in place of each prism spectroscope. A pair of direct-vision prism spectroscopes can also be made by utilizing a plurality of high and low dispersion glass elements 16' and 14' respectively for each prism spectroscope as shown in the embodiment of FIG. 2. The first direct-vision prism spectroscope comprises prisms $a, b, c, d$ and a portion of prism $e$ and the second direct-vision prism spectroscope comprises the remaining portion of prism $e$ and prisms $f, g, h$ and $i$. A different number of prisms can be used with more prisms providing greater separation of the wavelengths of light. Referring again to FIG. 1, optical processor 1 further comprises a pair of electro-optic crystals 18 and 20 each made, for example, from potassium dihydrogen phosphate (KDP). A set of strip electrodes is normally provided for each wavelength of light to be modulated in the laser beam. However, due to the distribution of the wavelengths in the input laser beam, all the red wavelengths, all the green wavelengths and all the blue wavelengths can be modulated together without further separation. Therefore, FIG. 1 shows three sets of strip electrodes 22–22a, 24–24a, and 26–26a disposed on opposite sides of the electro-optic crystals 18 and 20 thereby dividing the crystals into three light modulation sections. The corresponding strip electrodes in crystals 18 and 20 are coupled together by wires 22b and 22c, 24b and 24c and 26b and 26c so that strip electrodes 22, 24 and 26 on one electro-optic crystal are coupled respectively to strip electrodes 22a, 24a and 26a on the other crystal. If a laser is used which generates a different number or distribution of wavelength components, the number of sets of strip electrodes and their positions can be varied accordingly.

Positioned between the electro-optic crystals is a stepped 90° polarization rotator 28, having three steps 28a, 28b and 28c corresponding respectively to the three groups of wavelength components of light in the laser beam. If additional components are present in the laser beam, additional steps are provided. A second pair of direct-vision prism spectroscopes 30 and 32 positioned at the output of electro-optic crystal 20 are composed of low and high-dispersion glass elements 14 and 16 respectively, as in the first pair of prism spectroscopes.

Considering the operation of optical processor 1, the input laser beam is directed to lenses 34 and 36 which serve to reduce the diameter of the beam. Although the lenses are not required, the formation of a narrow diameter laser beam permits the use of thin electro-optic crystals which require relatively low modulating signal power and voltage and minimize the amount of dispersion needed to separate and recombine the multiwavelength beam. Alternatively, the diameter of the laser beam can be reduced by use of a convex mirror at the output of the laser cavity to cause the output beam to be convergent.

The laser beam is then directed to direct-vision spectroscope 10 which causes a wavelength-dependent angular dispersion of the laser beam thereby separating the input laser beam into a number of individual beams of light, with each individual beam of light corresponding to one of the wavelength components in the original laser beam. Due to the wavelength distribution in the input laser beam, the separated beams of light consist of three clusters of wavelengths of light with the beams of light in each cluster having approximately the same of light in each cluster having approximately the same color. Due to the wavelength distribution in the input laser beam, the red beam, designated R, consisting of the major and minor red wavelengths, the green beam, designated G, consisting of the major and minor green wavelengths and the blue beam, designated B, consisting of the major and minor blue wavelengths, each has a diameter of about 12 mils. By making the strip electrodes at least as wide as the diameter of the clusters, all the wavelengths in each beam cluster can be modulated simultaneously and utilized. It is also possible to separate out the minor red, minor green and minor blue beams and utilize only the major color beams. Preferably, the indices of refraction of the high and low dispersion elements of the prism spectroscope are chosen so as to be equal for light having a wavelength of about 5,500 Angstroms which is approximately in the center of the visible spectrum so as to insure that the same general direction of light transmission is maintained after dispersion occurs. The dispersed laser light is transmitted over an air path wherein the separation of the beams increases and arrives at the second prism spectroscope 12 after substantial separation of the beams. The second spectroscope 12 is identical with spectroscope 10 but oriented to cause exactly the opposite angular dispersion for each beam of light. Thus three parallel spaced-apart plane-polarized beams of light corresponding to the components of the input laser beam emerge from spectroscope 12. If a pair of prisms are used in place of prism spectroscopes 10 and 12, a similar result will be obtained. However, because the general direction of light transmission is changed when the light is transmitted through a single prism, a system utilizing only single prism beam separators is relatively difficult to align. In the embodiment of FIG. 2, the first and second prism spectroscopes operate to separate the beams of light in a similar manner. However, since a larger number of prisms are utilized, the required separation is achieved without the use of an air gap between the spectroscopes.

The individual beams of light are transmitted to the first electro-optic crystal 18. The crystal is arranged so that the electric vector of each beam of light is oriented at an intermediate angle, typically 45°, to the crystal axes. The crystal axes are in a plane perpendicular to the direction of propagation of the beam of light. Strip electrodes positioned on opposite faces of the crystal parallel to each beam of light form three light modulation sections with the red beam of light being transmitted between electrodes 22–22a, the green beam of light being transmitted between electrodes 24–24a and the blue beam of light being transmitted between electrodes 26–26a. A modulating signal applied across the appropriate pair of strip electrodes parallel to the first crystal axis causes a variation in birefringence of the crystal along the second crystal axis causing the component of each beam which is parallel to the second crystal axis to be phase modulated. The modulating voltage for the red beam of light is applied between strip electrodes 22–22a; the modulating voltage for the green beam of light is applied between strip electrodes 24–24a, and the modulating voltage for the blue beam of light is applied between strip electrodes 26–26a.

The individual beams of light emerge from electro-optic crystal 18 and are transmitted to stepped 90° polarization rotator 28. Each step is arranged to provide a 90° rotation in the direction of the polarization vector of the beam of light as it traverses the rotator. The beams of light are then transmitted to electro-optic crystal 20 which has its crystal axes oriented in the same direction as those of electro-optic crystal 18. The electric field in electro-optic crystal 20 is in a direction opposite from that of the electric field in electro-optic crystal 18 because of the manner in which the strip electrodes of crystals 18 and 20 are interconnected thereby causing opposite phase modulation of the other component of the light beam as it traverses the electro-optic crystal 20. Each light beam emerging from electro-optic crystal 20 therefore comprises two orthogonally plane polarized components which vary in intensity in accordance with the modulating voltage.

Light passing through crystals 18 and 20 also receives a retardation due to the natural birefringence of each crystal. The crystal axes of each crystal and the direction of the applied electric field are arranged so that one component of the light is phase modulated due to the modulating signal applied to the crystal while the other component is retarded due to the natural birefringence of the crystal. Retardation due to natural birefringence is thus imparted to both components of the light beam. By insuring that both electro-optic crystals are of equal length, both components receive the same retardation due to natural birefringence and no net retardation occurs due to natural birefringence of the crystals.

Alternatively, electro-optic crystals 18 and 20 are disposed with their crystal axes oriented 180° apart. In this embodiment the strip electrodes are arranged so that the electric field is applied in the same direction in both crystals.

The light emerging from electro-optic crystal 20 is transmitted to a second pair of direct-vision spectroscopes 30, 32 composed of low dispersion glass elements 14 and high dispersion glass elements 16 which are identical to the first pair of prisms 10 and 12. The second pair of prism spectroscopes are arranged so that the angular deviation imparted to the individual beams the angular deviation imparted to the individual beams will cause them to recombine to a single coaxial beam. A second direct-vision prism spectroscope identical with direct-vision prism spectroscope 10a shown in FIG. 2 can be substituted for the second pair of direct-vision prism spectroscopes 30 and 32 in order to recombine the individual beams of light into a single coaxial beam.

The diameter of the beam may be increased by transmission through lenses 44 and 46. If desired, amplitude modulation can be achieved, for example, by passing the light through a quarterwave retardation plate 48 and a polarizer 50 disposed with its angle coincident with the electric field of the incident light.

Referring now to FIG. 3, there is shown a block diagram of a laser color display system utilizing the optical processor of this invention. The display system includes a krypton-argon ion gas laser 52 which generates a coaxial beam of light having the same output characteristics as previously described. Although not required the display system includes filter 54 which blocks the major yellow wavelength but allows the remainder of the laser beam to enter optical processor 1.

Video input signals No. 1, No. 2 and No. 3 provide the video information for the three beams of light and are applied to one of the electrodes of each set of strip electrodes. A signal from square wave generator 56 is applied to the other electrode of each set of strip electrodes to provide a positive image display. A power supply 58 and potentiometer 60, 62 and 64 are provided so that the zero levels of the square wave signal can be individually adjusted.

The light beams incident of the electro-optic crystals are converted into components parallel to each of the crystal axes. Application of voltage across the strip electrodes causes phase modulation of the component perpendicular to the applied electric field, each component being phase modulated during transmission through one of the electro-optic crystals. The light beams emerging from the second electro-optic crystal therefore comprise first and second orthogonal plane polarized components. Since the display system utilizes both components, the output polarizer 50 and quarterwave retardation plate 48 of FIG. 1 are not required. The magnitude of the square-wave signal from generator 56 is adjusted so that the first and second orthogonal plane polarized components alternately appear at the output of the modulator. During the half-cycle that the square-wave is zero, the first component has full intensity and the second component essentially zero intensity. When the square-wave is at its high level, the relative intensities of the components of each beam are reversed. The polarity of the video signals is chosen, in the case where a positive image is to be displayed, so that during the half cycle that the square-wave drive is zero, the second components contain positive video information and the first components contain negative video information. During the other half cycle, the first components are positively modulated and the second components are negatively modulated. Thus, the first and second components of each beam are alternately intensity modulated by positive video information. The simultaneous provision of negative video modulation in the opposite beams is due to the fact that electro-optic modulators produce sinusoidal variations in the intensity of the emerging component beams with applied modulating signal with a constant total intensity.

The square-wave drive signal provided by generator 56 is synchronized with the horizontal sync signal applied at terminal 66 and has a frequency which is equal to half of the line scan frequency. In a conventional television display, the line scan frequency is standardized at 15.75 kilohertz.

The beam of light emerging from the modulator is transmitted through a vertical retrace blanker 68 which is arranged to block the beam of light during the vertical retrace interval. The vertical retrace blanker comprises a pair of concentric discs maintained in spaced-apart relationship by a pair of light stops arranged 180° apart around the periphery of the discs. In operation, the vertical retrace blanker 68 rotates on its axis in synchronism with the vertical sync signal applied at terminal 70 by square-wave generator 72 and drive amplifier 74. During the trace time, the beam of light passes between the discs, and during the retrace time, the beam of light is incident on one of the light stops which prevents the light from impinging upon the display screen.

Since the first and second components of each beam of light are colinear when they emerge from optical processor 1, polarization beam splitter 76 is interposed between the output of the optical processor and dual beam scanner 78 to spatially separate the first and second components of each beam. The two beams of light emerging from the beam splitter are transmitted to dual beam scanner 78. The dual beam scanner provides the horizontally scanned output beam containing the first and second components during the intervals they contain the positive video information. The scanner includes a motor driven rotating polygonal mirror. The speed of the drive motor is determined by the frequency of voltage controlled oscillator 80 which is controlled by the result of a phase comparison between the horizontal sync signal and an internally produced signal from the peripheral photo detectors 82. The phase comparison is performed by sync detector 84 which provides an output voltage having a magnitude which is a function of the phase difference of the signals applied thereto.

The horizontally line scan pattern provided by the output beam of the dual beam scanner 78 is applied to a single beam scanner 86 which is oriented to steer the beam in a direction orthogonal to the line scan and thereby generate the vertical scan pattern required by the display system. The single beam scanner 86 may be a rotating mirror, a piezoelectrically driven oscillating mirror or a large-angle D'Arsonval ballastic galvanometer driven mirror. The rate at which the beam scanner is driven is determined by voltage controlled oscillator 88. The oscillator frequency is controlled by the output voltage of sync detector 90 which is determined by the result of a phase comparison between a signal from the peripheral photo detectors 82 and the vertical sync signal applied at terminal 70. The beam emerging from the single beam scanner is directed to the display screen 92 whereupon it forms a raster scan and displays an image in accordance with the color video information. As shown, photo detectors 82 are placed between the display screen and the single beam scanner and are positioned so as to monitor the emerging beam at the extremities of the scan pattern.

A more detailed description of the operation of beam splitter 76, dual beam scanner 78, single beam scanner 86 and peripheral photo detectors 82 can be obtained from my copending application Ser. No. 728,218 which is assigned to the same assignee as the instant application.

What I claim is:

1. An optical processor for separately modulating a plurality of coaxial laser beams having different wavelengths comprising:

a. a pair of direct-vision prism spectroscopes each comprising identical low dispersion and high dispersion optic elements; said first prism causing a wavelength-dependent angular dispersion of said coaxial laser beams, said second prism causing a wavelength-dependent angular dispersion in the opposite sense from that which occurred in said first prism, said light emerging from said second prism comprising a plurality of parallel spaced-apart beams of light, each beam of light corresponding to one of the coaxial laser beams;

b. a compensated-birefringent modulator comprising a pair of electro-optic crystals, a 90° polarization rotator positioned between said crystals, and a set of strip electrodes coupled to the electro-optic crystals parallel to each of the beams emerging from said second prism spectroscope, each of said beams of light being polarization modulated by the application of a separate modulating signal to each of said strip electrodes; and c. a second pair of direct-vision prism spectroscopes positioned in the path of light emerging from said modulator, said second pair of direct-vision spectroscopes being identical with said first pair of direct-vision spectroscopes, said second pair of direct-vision prism spectroscopes causing a wavelength-dependent angular deviation to each of said beams of light, causing said light emerging from said pair of prism spectroscopes to be recombined into a single coaxial laser beam.

2. An improved laser video display system of the type wherein each wavelength of a multiwavelength coaxial laser beam is resolved into first and second orthogonal components with each component having video information imparted thereto, and wherein said coaxial laser beam is directed to a polarization beam splitter which spatially separates said first and second components into two composite beams, wherein each of said composite beams is directed to a horizontal beam scanner which provides the horizontal deflection for each of said composite beams, and wherein said composite beams are then directed to a vertical beam scanner which provides vertical deflection of said composite beams, the combined deflection caused by said horizontal and said vertical beam scanners causing a raster scan on a display screen, wherein the improved apparatus for imparting video information to said multiwavelength laser beam comprises:

a. a pair of direct-vision prism spectroscopes each comprising identical low dispersion and high dispersion optic elements, said first prism spectroscope causing a wavelength-dependent angular dispersion of said coaxial laser beams, said second prism spectroscope causing a wavelength-dependent angular dispersion in the opposite sense to that which occurred in said first prism, said light emerging from said second prism spectroscope comprising a plurality of parallel spaced-apart beams of light, each beam of light corresponding to one of the coaxial laser beams;

b. a compensated-birefringent modulator comprising a pair of electro-optic crystals, a stepped 90° polarization rotator positioned between said crystals, and a set of strip electrodes coupled to the electro-optic crystals parallel to each of the beams emerging from said second prism spectroscope, application of a video signal across the appropriate set of strip electrodes causing each of said beams of light to emerge from said modulator having two orthogonally polarized components containing video information; and c. a second pair of direct-vision prism spectroscopes positioned in the path of the beams of light emerging from said modulator, said second pair of prism spectroscopes imparting a wavelength-dependent angular dispersion to each of said beams of light causing said light emerging from said second pair of prism spectroscopes to be recombined into a signal coaxial laser beam, said coaxial laser beam being directed to said beam splitter.

3. An optical processor for separately modulating a plurality of coaxial wavelength components of light contained within a multiwavelength laser beam comprising:

a. means for separating said wavelength components of light positioned in the path of said laser beam, said separation means separating said laser beam into a plurality of parallel spaced-apart beams of light, each beam of light corresponding to one of the wavelength components of light in the laser beam; said separation means comprising a pair of direct-vision prism spectroscopes, the first prism spectroscope causing a wavelength-dependent angular dispersion of said coaxial beams without changing the general direction of light transmission, said coaxial beams being separated into a plurality of individual beams of light, said second prism spectroscope causing a wavelength-dependent angular dispersion in the opposite sense from the angular dispersion which occurred in said first section without changing the general direction of light transmission, said light emerging from said second direct-vision prism spectroscope comprising a plurality of parallel spaced-apart beams of light, each beam of light corresponding to one of the wavelength components of light in the laser beam; and b. a light modulator comprising a pair of electro-optic crystals having a set of strip electrodes parallel to each of the individual beams of light, said beams of light being polarization modulated by application of a separate modulating signal to each set of strip electrodes.

4. The optic processor of claim 3, wherein each of said prism spectroscopes comprises identical low and high dispersion optic elements, said prism spectroscopes being separated by an air gap.

5. The optical processor of claim 4 further comprising a second pair of direct-vision prism spectroscopes positioned in the path of the beams of light emerging from said modulator, said second pair of prism spectroscopes imparting a wavelength-dependent angular deviation to each of said beams of light causing said light emerging from said pair of prism spectroscopes to be recombined into a single coaxial laser beam.

6. The optical processor of claim 5 wherein said first and second pair of direct-vision prism spectroscopes are identical.

7. The optical processor of claim 3 wherein each of said prism spectroscopes comprises a plurality of alternating high and low dispersion optic elements.

8. An optical processor for separately modulating a plurality of coaxial wavelength components of light contained within multiwavelength laser beam comprising:

a. means for separating said wavelength components of light positioned in the path of said laser beam, said separation means separating said laser beam into a plurality of parallel spaced-apart beams of light, each beam of light corresponding to one of the wavelength components of light in the laser beam; said separation means comprising a pair of prisms separated by an air gap, the first prism causing a wavelength-dependent angular dispersion of said coaxial beams, the coaxial beams being separated into a plurality of individual beams of light, said second prism causing a wavelength-dependent angular dispersion which occurred in said first prism, said light emerging from said second prism comprising a plurality of parallel spaced-apart beams of light, each beam of light corresponding to one of the wavelength components of light in the laser beam; and b. a light modulator comprising a pair of electro-optic crystals having a set of strip electrodes parallel to each of the individual beams of light, said beams of light being polarization modulated by application of a separate modulating signal to each set of strip electrodes.

* * * * *

PO-1050
(5/69)

UNITED STATES PATENT OFFICE
CERTIFICATE OF CORRECTION

Patent No. 3,710,015                     Dated January 9, 1973

Inventor(s) Vernon J. Fowler

It is certified that error appears in the above-identified patent and that said Letters Patent are hereby corrected as shown below:

Column 2, line 35, change "by" to --but--;
Column 8, line 3, change "horizontally" to --horizontal--;
Column 8, line 8, after "may be" insert --a--; and
Column 9, line 49, change "signal" to --single--.

Signed and sealed this 26th day of June 1973.

(SEAL)
Attest:

EDWARD M. FLETCHER, JR.
Attesting Officer

ROBERT GOTTSCHALK
Commissioner of Patents